Patented Nov. 6, 1945

2,388,506

UNITED STATES PATENT OFFICE 2,388,506

PURIFICATION OF NITRILES

John W. Teter, Chicago, Ill., assignor to Sinclair Refining Company, New York, N. Y., a corporation of Maine No Drawing. Application October 6, 1943, Serial No. 505,195

2 Claims. (Cl. 202—42)

This invention relates to the refining of nitriles and relates more particularly to an improved method of separating hydrocarbon impurities from nitriles containing 3 to 4 carbon atoms per molecule, i. e. propionitrile and butyronitriles.

These nitriles may with advantage be prepared by the amination of olefinic hydrocarbon at an elevated temperature. The crude, stabilized nitrile product of such amination is usually composed primarily of a mixture of propionitrile, iso-butyronitrile and normal butyronitrile and frequently contains hydrocarbon impurities. These nitriles may be isolated by close fractional distillation of the crude product. However, the thus isolated nitriles are frequently contaminated by hydrocarbons which distill off within the same temperature range as the nitrile and pass over with the respective nitriles from the fractionating operation in varying amounts, as an azeotrope.

The complete separation of such hydrocarbon impurities from these nitriles by direct fractional distillation has heretofore been extremely difficult, if not impossible.

My present invention provides a method whereby substantially complete removal of these hydrocarbon impurities from these nitriles may be effected by direct fractional distillation.

I have discovered that the hydrocarbon contaminant of the nitrile fractions forms an azeotrope with methyl alcohol in the presence of the respective nitriles, which azeotrope has a boiling point substantially below that of these nitriles and may be separated therefrom by fractional distillation without substantial loss of the nitrile.

The boiling point of pure propionitrile, for example, is approximately 97° C., and that of pure methyl alcohol is 64.6° C. The azeotrope formed by methyl alcohol and the hydrocarbon contaminants has been found to boil at about 63.5° C., at atmospheric pressure, and to have a refractive index of 1.3480, as compared with a refractive index of 1.3290 for pure methyl alcohol.

Further, the methyl alcohol has been found not to form binary azeotropes containing any material quantity of either of these nitriles, or ternary azeotropes with the nitriles and hydrocarbon impurities, to any substantial extent. A small amount of propionitrile may be carried over with the alcohol or alcohol-hydrocarbon mixture, possibly as a ternary azeotrope, but this amount is usually so small as to constitute no serious economic loss, even if not subsequently recovered.

Thus substantially complete removal from the nitrile of the added alcohol and the hydrocarbon impurity may be directly effected by distillation. Further, the methyl alcohol can be readily separated from the hydrocarbon of the azeotrope by water-washing, reclaimed by fractionation and recycled to the nitrile purification step. Any nitrile carried off with the alcohol may also be recovered and recycled.

Utilizing this peculiarity of methyl alcohol and the hydrocarbon contaminants to form a readily separable azeotrope in the presence of propionitrile or butyronitriles, the process of my present invention comprises adding methyl alcohol to the nitrile-hydrocarbon mixture and fractionally distilling the mixture to separate the methanol-hydrocarbon azeotrope from the nitrile. The optimum proportion of methyl alcohol to be added will depend upon the proportion of hydrocarbon contaminant present.

In small scale operation, particularly, I have found it frequently desirable to add, in addition to the methyl alcohol, a proportion of a stable, higher boiling liquid to constitute a residual liquid in the still, which will not be decomposed or distilled off at the distillation temperature of the nitrile or of the azeotrope and which will not interfere with separation of the methanol-hydrocarbon azeotrope from the nitrile. I have found lauryl alcohol to be satisfactory for this purpose. By its use, danger of polymerizing and coking of the nitrile being distilled is substantially avoided and a more complete recovery of the nitrile is made possible. However, it will be understood that the use of such extraneous bottoms material is not essential to my purification process.

Pure propionitrile, for example, has been found to have a specific gravity of 0.783, theoretically to contain 25.5% nitrogen and, at 20° C. to have a refractive index of 1.3668. Its boiling point at atmospheric pressure, as previously noted, is 97° C.

The invention will be illustrated by the following specific examples.

*Example I*

A synthetic mixture was prepared from 20 cc. of propionitrile, having a refractive index of 1.367 at 20° C., and 5 cc. of hydrocarbons separated from a hydrocarbon-contaminated propionitrile product by chilling. To this synthetic mixture there was added an equal volume of methyl alcohol and the whole was subjected to fractional distillation in a 9.5 millimeter Stedman column.

The methanol-hydrocarbon fraction was distilled off at 63.5° C. and had a refractive index at 20° C. of 1.3480. The nitrile fraction distilled off at 96° C. and was found to have a refractive index of 1.367 at 20° C., identical with that of the propionitrile from which the synthetic mixture was prepared. Its nitrogen content was found to be 24.1%, which value is normally obtained for practically pure propionitrile by the Kjeldahl method, which was used. This nitrile product was free from hydrocarbon impurities.

*Example II*

A hydrocarbon - contaminated propionitrile product having a nitrogen content of 19.1%, corresponding to a purity of 75.2%, and a refractive index at 20° C. of 1.3754, was mixed with an equal volume of methyl alcohol and subjected to fractional distillation in a 9.5 millimeter Stedman column. The methanol-hydrocarbon fraction distilled off at 63.5-64° C., the refractive index dropping toward the end of the cut indicating exhaustion of the hydrocarbon constituent. The nitrile fraction came off at about 96° C. and had a refractive index of 1.365 at 20° C., a nitrogen content of approximately 24.5% and was substantially free from hydrocarbon impurities.

*Example III*

A further hydrocarbon-contaminated propionitrile product was found to contain about 17% nitrogen corresponding to a purity of 67.5%, and to have a refractive index of 1.3790 at 20° C. Equal volumes of this impure propionitrile and of methanol, the latter having a refractive index of 1.3301 at 20° C., were subjected to fractional distillation in a 9.5 millimeter Stedman column. An amount of lauryl alcohol equal to the volume of the nitrile was added as a bottoms.

In this distillation the methanol-hydrocarbon fraction passed off at a temperature of 63.5° C., the temperature gradually approaching 64.5° C., toward the end of the cut, indicating that the hydrocarbon in the mixture was becoming exhausted. The amount of this azeotrope fraction was about 56% of the nitrile-methanol charge. Thereafter substantial pure propionitrile was distilled off at a temperature of about 96° C. and this fraction was found to have a refractive index at 20° C. of about 1.3668 and to contain 24.1% nitrogen.

*Example IV*

In a larger scale distillation conducted in a 1-inch Stedman column, the charge consisted of 1165 cc. of hydrocarbon-contaminated propionitrile and 1165 cc. of methyl alcohol. During the distillation 250 cc. of lauryl alcohol was added to prevent coking of the nitrile. In this distillation the methanol-hydrocarbon azeotrope came off at a temperature of 62.5-63° C. The refractive index of this fraction gradually dropped, approaching that of methyl alcohol as the distillation proceeded, indicating exhaustion of the hydrocarbon from the mixture. The nitrile fraction came over at 95-96° C. The refractive index of the hydrocarbon-contaminated propionitrile charge was 1.3702, and that of the thus obtained fraction was 1.3668 indicating complete purification. 920 cc. of the purified propionitrile was obtained, this being equivalent to 79% of the impure charge. A further portion of the nitrile remained in the bottoms and a relatively small amount, not more than a few per cent, was found in the azeotrope fraction.

The refractive index of pure normal butyronitrile at 20° C. has been found to be 1.3840. This nitrile contains, theoretically, 19.4% of nitrogen and boils at 118° C.

*Example V*

A normal butyronitrile product contaminated with hydrocarbon was found to have a refractive index of 1.3968 and to contain 14.3% nitrogen, corresponding to a purity of 70.5%. A portion of this impure nitrile, to which four times its volume of methyl alcohol had been added, was subjected to distillation in a 9.5 millimeter Stedman column and the normal butyronitrile fraction thus obtained was found to have a refractive index of 1.3830 and to contain 19.5% nitrogen, indicating that substantially all of the hydrocarbon impurities had been removed with the methyl alcohol.

The proportion of methyl alcohol to be added for optimum results will, as previously noted, vary with the proportion of hydrocarbon contaminant present. In the foregoing experiment, where the butyronitrile was only 70.5% pure, more than an equal volume of methyl alcohol was found to be required for maximum purification.

*Example VI*

A second sample of hydrocarbon-contaminated normal butyronitrile was found to have a refractive index at 20° C. of 1.3848, a nitrogen content of 18.9%, and a specific gravity of 0.7815. Because of the greater purity of this sample it appeared to be possible to effect substantially complete removal of the hydrocarbon impurities therefrom by a smaller proportion of methyl alcohol than was used in the preceding distillation. Accordingly equal volumes of this sample and of methanol, the latter having a refractive index of 1.3290, were subjected to distillation in a 9.5 millimeter Stedman column and the resultant normal butyronitrile fraction was found to have a refractive index of 1.3840 at 20° C., this being the refractive index of purely normal butyronitrile. In this distillation the methanol hydrocarbon mixture boiled off at a constant temperature of about 64° C.

*Example VII*

The above described distillation was repeated using two volumes of methyl alcohol per volume of the nitrile with comparable results. The nitrile fraction thus obtained had a specific gravity of 0.7906 and came over at 114-116° C.

*Example VIII*

Pure iso-butyronitrile theoretically contains 20.3% nitrogen and has been found to have a refractive index of 1.3730 at 20° C. and to boil at about 102.8-103.8° C. A sample of hydrocarbon-contaminated iso-butyronitrile, boiling within the range of 100-104° C. and having a refractive index at 20° C. of 1.3779, was subjected to distillation with an equal volume of methyl alcohol in a 9.5 millimeter Stedman column. There was a sharp break between the methanol-hydrocarbon fraction and the nitrile fraction. The former came over at the previously indicated temperature of about 63-64° C. while the iso-butyronitrile fraction was obtained at about 102° C. and was found to have a refractive index at 20° C. of 1.3730, indicating that this refraction was substantially pure iso-butyronitrile. A repetition of the distillation using a double portion of methyl alcohol gave comparable results.

In order to identify the type of hydrocarbon contaminant present in these nitrile products, the alcohol-hydrocarbon fraction from the purification of propionitrile was washed with water and the hydrocarbon layer removed, dried and fractionally distilled. In this distillation it was found that the vapor temperature rises gradually from 132 to 134° C. over a range 17.5 to 52 volume % distilled while the refractive index is constant at 1.4175. The boiling point, refractive index and specific gravity characteristics of these hydrocarbons indicate the presence of an isomeric nonene. Further analysis of the hydrocarbon material indicates that it consists of 12.6% paraffins, 64% olefins, 20.6% naphthenes and 2.8% aromatics.

The identity and composition of the hydrocarbon contaminants may vary somewhat. However, I have consistently found them to be substantially completely removable from these nitriles by my improved distillation process.

The invention is illustrated in the foregoing examples by a complete fractional distillation of the mixture. It will be understood, however, that the invention also contemplates an operation wherein the distillation proceeds only to the point where the methanol-hydrocarbon fraction has been distilled off.

I claim:

1. A process for removing hydrocarbon impurities from nitriles of the class consisting of propionitrile, normal butyronitrile, and iso-butyronitrile which comprises adding methyl alcohol to the hydrocarbon-contaminated nitrile and distilling off the hydrocarbon contaminant and added alcohol from the nitrile as an azeotrope.

2. A process for removing hydrocarbon impurities from nitriles of the class consisting of propionitrile, normal butyronitrile, and iso-butyronitrile which comprises adding methyl alcohol to the hydrocarbon-contaminated nitrile and subjecting the mixture to fractional distillation.

JOHN W. TETER.